April 7, 1970  B. E. LENEHAN  3,505,600
MAXIMUM DEMAND DEVICE WITH PLURAL ORDER INDICATION
Filed Aug. 2, 1967  3 Sheets-Sheet 1

United States Patent Office 3,505,600
Patented Apr. 7, 1970

3,505,600
MAXIMUM DEMAND DEVICE WITH PLURAL
ORDER INDICATION
Bernard E. Lenehan, Bloomfield, N.J., assignor to Westinghouse Electric Corporation, Pittsburgh, Pa., a corporation of Pennsylvania
Filed Aug. 2, 1967, Ser. No. 657,888
Int. Cl. G01r 19/16
U.S. Cl. 324—103     10 Claims

ABSTRACT OF THE DISCLOSURE

In order to determine the maximum demand of a variable quantity, the quantity is translated into rotary and axial movement of a driving member which is reset at the end of each demand interval. This member is aligned with a rotatable and axially movable driven member. These members are coupled to each other when they occupy predetermined relative axial positions. The driven element operates a counter and is reset at the end of each billing interval.

BACKGROUND OF THE INVENTION

This invention relates to maximum demand devices and it has particular relation to maximum demand devices having readout presentations arranged in plural decimal orders.

For many years the conventional maximum demand indicating meter employed a readout presentation in the form of the long pointer associated with a scale. However, attempts have been made to provide a readout arranged in plural decimal orders. Readouts of this type are shown in the Eugene C. Benbow Patent 3,398,367 and in the Patent 3,421,084 of Eugene C. Benbow and Earl L. Burnette.

SUMMARY OF THE INVENTION

In accordance with the invention, a plural decimal order readout is operated by a driving member and a driven member which are axially aligned and which are arranged for independent rotational and axial movement. Rotation of the driven member is effective for actuating the readout.

During a demand interval, the driving member is rotated and axially moved in accordance with a variable quantity the maximum demand of which is to be indicated. The driving member is reset at the end of each demand interval. When the driving and driven members are within a predetermined distance of each other, they are coupled to permit rotation of the driven member by the driving member. Such coupling occurs during a billing interval only if the axial movement of the driving member exceeds that occurring during a preceding demand interval within the same billing period. At the end of each billing period, the members are reset.

It is therefore an object of the invention to provide a simple and compact maximum demand device having a plural order readout.

BRIEF DECRIPTIONS OF THE DRAWINGS

Other objects of the invention will be apparent from the following description taken in conjunction with the accompanying drawings, in which.

DESCRIPTION OF THE PREFERRED EMBODIMENTS

Figure 1:
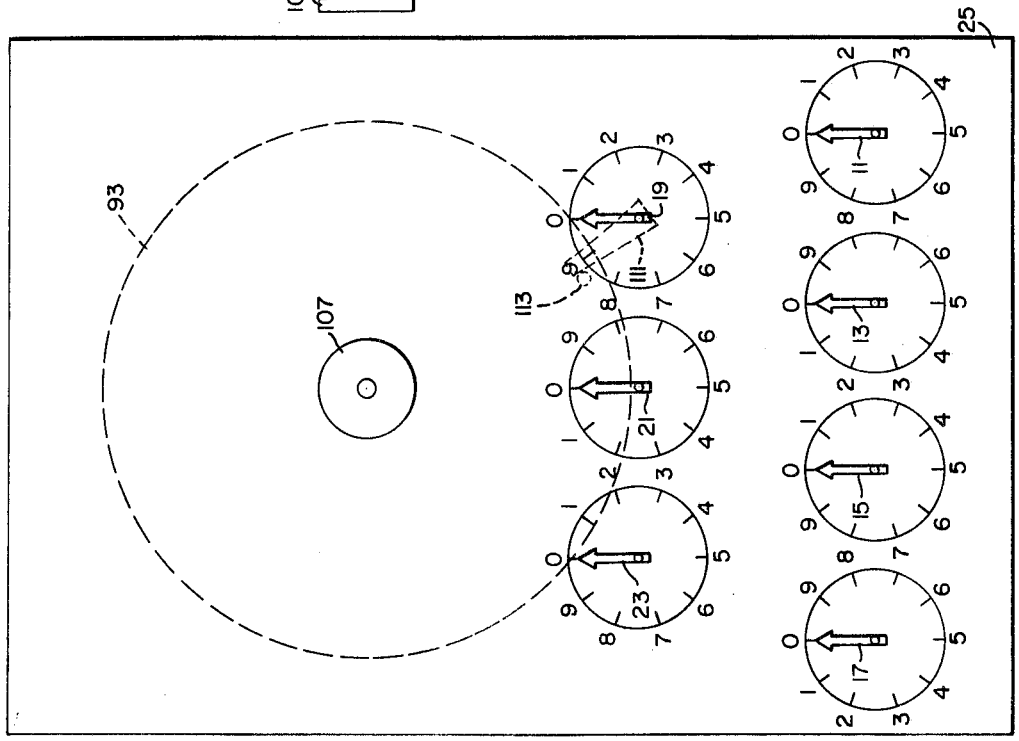
FIGURE 1 is a view in front elevation of a maximum demand device embodying the invention.

Referring to the drawings FIGURE 1 shows a maximum demand device having two presentations. The first presentation is provided by four pointers 11, 13, 15 and 17 which are mounted for rotation about the axes of their supporting shafts. Each of the pointers cooperates with a separate circular scale divided into part identified by the digits 0 to 9 inclusive. The pointers are operated in a conventional manner to indicate the total of a quantity to be measured. Thus in the embodiment of FIG. 1, the pointers may be coupled to the shaft of the watthour meter to indicate the kilowatt hours supplied by an electric circuit to a load. The pointers 11 to 17 may indicate respectively units, 10's, 100's and 1000's of the quantity being measured.

In a similar manner, three pointers 19, 21 and 23 are associated with circular scales each divided into 10 parts for the purpose of indicating the maximum demand of the quantity being measured. The pointer 19 may indicate units whereas the pointers 21 and 23 indicate respectively 10's and 100's of the maximum demand.

It will be understood that in each presentation the pointers may be coupled together. Thus the pointer 21 rotates at one tenth of the rate of the pointer 19 and the pointer 23 rotates at one tenth of the rate of the pointer 21.

Figure 2:
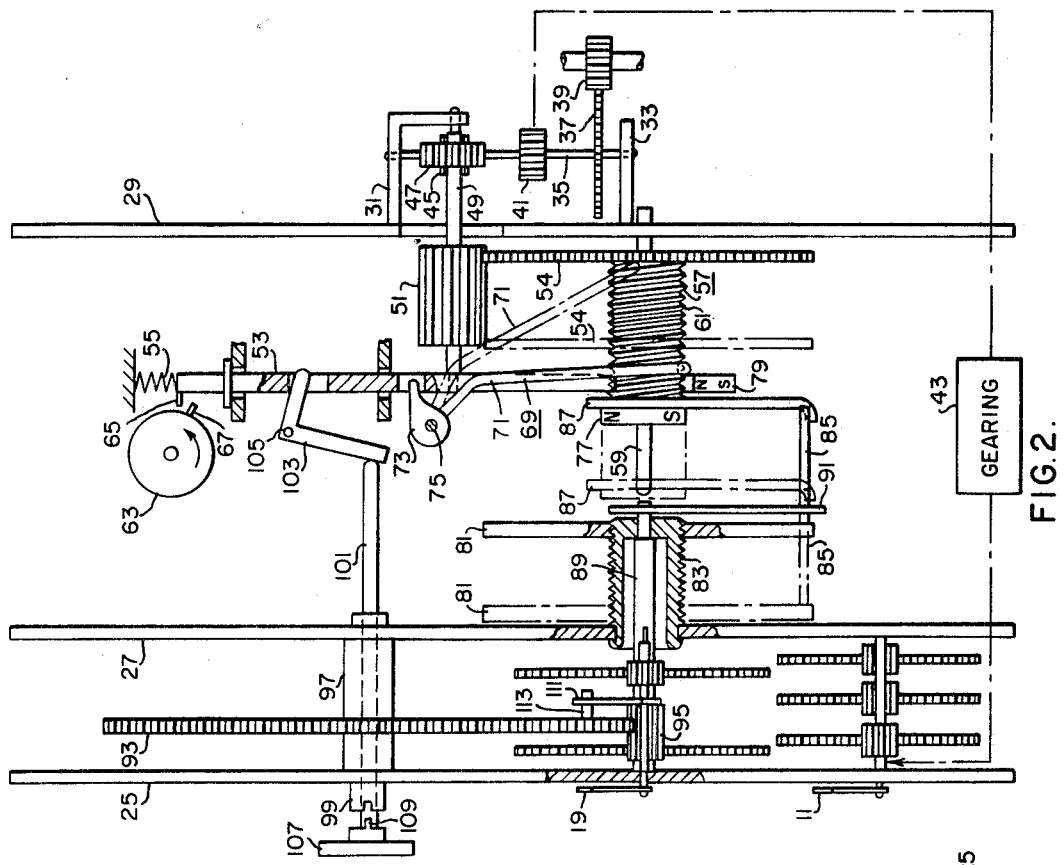
FIG. 2 is a view in side elevation with parts broken away and parts shown schematically of the device illustrated in FIG. 1.

As shown in FIG. 2, the maximum demand device includes a supporting structure represented by plates 25, 27 and 29. The plate 25 constitutes the dial plate for the pointers. The plate 29 includes a pair of brackets 31 and 33 which support a shaft 35 for rotation. This shaft carries a gear 37 which is coupled to a pinion 39 rotated in accordance with the quantity to be measured. In the present case, it is assumed that the pinion 39 is rotated by a watthour meter.

A pinion 41 is secured to the shaft 35 and is coupled by gearing 43 in a conventional manner to the pointers 11, 13, 15 and 17 for the purpose of operating these pointers to indicate the kilowatt hours being measured by the watthour meter. The shaft 35 also carries a worm 45 which engages a worm wheel 47 mounted on a shaft 49 which has a pinion 51 secured thereto. The shaft 49 is mounted for rotation by the bracket 31 and by a slide member 53 which is biased downwardly to the position illustrated by means of a spring 55 but which may be moved against such bias in a vertical direction. Such movement of the slide member carries the pinion 51 from meshing engagement with a gear 54 out of such engagement.

The gear 54 forms part of the driving member 57 which is mounted for rotation and axial movement on a pin 59 secured to the plate 29. The driving member 57 includes a threaded sleeve 61 which is in threaded engagement with the threads of a partial nut formed on the lower end of the slide member 53. Thus, when the slide member is raised against the bias of its spring 55 the partial nut releases the sleeve 61.

At the end of each demand interval the slide member 57. Mechanism for this raising operation is well 53 is raised for the purpose of resetting the driving known in the art. For illustrative purposes, it will be assumed that a disk 63 is rotated once for each demand interval. Demand intervals of 15, 30 and 60 minutes have been employed in the prior art. The slide member 53 carries a lug 65 which is in the path of a lug 67 secured to the rim of the disk 63. Thus if the disk 63 rotates once in 30 minutes, at the end of each 30 minute interval, the lug 67 engages the lug 65 to raise the slide member 53. Such raising of the slide member pivots the elongated pinion 51 out of mesh with the gear 53. In addition, such raising of the slide member operates a resetting bell crank 69 to reset the driving member 57.

The bell crank 69 includes a resetting arm 71 positioned to the left of the gear 54. The bell crank also has an operating arm 73 which projects into a slot provided in the slide member 53. When the slide member is raised, the bell crank is rotated in a counterclockwise direction about its axis 75. The resulting movement of the resetting arm 71 forces the gear 54 and the associated parts of the driving member 57 from a dotted-line operated position to the reset position illustrated in full lines FIG. 2. The lug 67 thereafter clears the lug 65 to permit return of the slide member 53 for the purpose of restoring the mesh between the slide member and the screw 61 and between the pinion 51 and the gear 54.

During the resetting operation of the driving member it is desirable to return the driving member to a predetermined angular position relative to its axis. A mechanical mechanism suitable for this purpose will be discussed with reference to FIGS. 3, 4 and 5. In the specific embodiment of FIG. 2 a permanent magnet 77 having polarities as shown is secured to one end of the driving member. A second permanent magnet 79 having polarities as shown is secured to the supporting structure. During the resetting operation, like poles of the two magnets repel each other and unlike poles of the two permanent magnets attract each other for the purpose of bringing the driving member into the correct angular position.

From the foregoing discussion, it will be clear that during each demand interval the driving member 57 is moved to the left from its reset position by an amount dependent on the demand for such interval. Also, the number of rotations of the driving member during such demand interval corresponds to the demand for the interval.

The driving member 57 is employed to move a driven member 81 to the left as viewed in FIG. 2 and to rotate the driven member to an extent dependent upon the maximum of the demands measured by the driving member 57 during any billing period. As shown in FIG. 2, the driven member 81 is in the form of a nut which is in threaded engagement with a screw 83 secured to the plate 27. It will be noted that the driving and driven members are aligned with each other. At a position spaced from its axis, the driven member 81 carries a pin 85 which projects towards the driving member. This pin is positioned to be engaged by the end of an arm or dog 87 which extends radially from the axis of the driving member 57.

Rotation of the nut 81 is transmitted to the pointer 21. Thus the nut 81 acts as an input member for the pointer. To this end, the pointer is mounted on a shaft 89 which is on the axis of the screw S and which projects through the end of the screw 83 to support an arm 91 having a fork at its end. The tines of this fork extend on opposite sides of the pin 85. Thus, the pin 85 is free to move axially through the fork of the arm 91 but causes the arm and the nut 81 to rotate as a unit.

At the end of each billing period, the maximum demand may be read from the pointers 19, 21 and 23 and the device then may be reset. To this end, a resetting gear 93 meshes with a pinion 95 secured to the shaft 89. The gear 93 is secured to a sleeve 97 which is mounted for rotation in the plates 25 and 27 and which has a slotted neck 99 projecting to the left of the plate 25. A rod 101 passes slidably through the sleeve 97 and is held captive by the sleeve. The right-hand end of this rod engages one arm of a bell crank 103 which is pivoted for rotation about a pivot 105. The remaining end of the bell crank extends into a slot provided in the slide member 53. The left-hand end of the rod 101 has secured thereto a knob 107 having a key 109 positioned to be received in the slots of the neck 99.

At the end of a billing period, a meter reader may take the demand reading and then move the knob 107 to the right as viewed in FIG. 2 for the purpose of acting on the bell crank 103 to move the slide member 53 upwardly. This resets the driving member 57 in the manner previously discussed. At the end of its movement, the knob 107 introduces the key 109 into the slot of the neck 99 and the meter reader then rotates the knob and the resetting gear 93 as a unit for the purpose of resetting the pointers 19, 21, and 23 together with the nut end. The meter reader may observe the pointers for the purpose of stopping the resetting movement when the pointers reach their zero positions. However, the shaft which carries the pointer 19 may also carry an arm 111 which engages a pin 113 secured to the gear 93 when the pointers are in their zero position. Thus as shown in FIG. 1, the meter reader may rotate the gear 93 in a clockwise direction until the pin 113 engages the arm 111. The meter reader next may release the knob 107 and the device is in condition for operation over another billing period.

The operation of the device shown in FIGS. 1 and 2 may be reviewed briefly. It will be assumed that a meter reader has just completed a reading that he has reset the device and that the parts are in the positions illustrated in full lines in FIGS. 1 and 2. As the watthour meter rotates, the pointers 11, 13, 15 and 17 are operated in a conventional manner to register the kilowatt hours transmitted by an electrical circuit with which the watthour meter is associated. In addition, the watthour meter operates through the gearing 39, 37, 45, 47, 51 and 54 to rotate the driving device or member 57. As the driving member 57 rotates, its screw 61 runs in the associated partial nut formed in the end of the slide member 53 to move the driving member to the left as viewed in FIG. 2. At the same time, the dog 87 operates through the pin 85 to rotate the nut 81 and the arm 91. Inasmuch as the arm 91 is on the shaft of the pointer 21 the pointer 21 rotates up scale. Through associated gearing, the shaft 89 rotates the pointer 23 at one tenth the rate of the pointer 21 and rotates the pointer 19 at ten times the rate of the pointer 21. As the nut 81 rotates, it moves to the left on its associated screw 83 and carries with it the pin 85. However, since the pin 85 and the dog 87 move axially at the same rate they remain in engagement and follow helical paths.

At the end of the first demand interval following the reading, the disk 63 rotates into a position bringing the lugs 65 and 67 into engagement and the slide 53 consequently is moved up to reset the driving member 57. As a result of its upward motion, the slide member 53 moves the pinion 51 out of engagement with the gear 54 and operates the resetting bell crank 69 to force the gear 54 to its reset position. In addition, the field between the permanent magnets 77 and 79 cooperate to move the driving member into the correct angular position. The nut 81 and the pin 85 remain in the positions to which they were advanced during the demand interval just completed.

The lug 67 next clears the lug 65 and the spring 55 urges the slide member 53 to the position illustrated in FIG. 2. In this position, the pinion 51 is again in engagement with the gear 54 and the slide member has its partial nut in threaded engagement with the screw 61. During the succeeding demand interval, the driving member 57 again rotates and moves to the left as viewed in FIG. 2. During at least the initial part of this movement the dog 87 is to the left of the pin 85 and consequently cannot drive the unit 81 and the arm 91. Consequently the pointer 21 and the associated pointers remain at rest. Let it be assumed first that the demand during the second demand interval is less than that registered during the first demand interval. Under such circumstances, the driving member is reset in the manner previously described before the dog 87 reaches the pin 85 and no movement of the pointers 19, 21 and 23 occurs during such second demand interval.

However, if the demand during the second demand interval is greater than that occurring during the first demand interval, the dog 87 ultimately reaches the pin 85 and rotates the nut 81 together with the arm 91. This rotation continues until the end of the second demand interval at which time the driving member is reset in the manner previously described. The additional rotation of the arm 91 advances the pointers 19, 21 and 23 to a new reading which represents the demand for the second demand interval. These operations are repeated until the end of the billing period. At any time during the billing period the reading of the pointers 19, 21 and 23 represents the maximum of the demands occurring during any interval of the billing period up to the time of reading.

At the end of the billing period, a meter reader notes the reading of the pointers and then pushes the knob 107 to the left as viewed in FIG. 2 for the purpose of actuating the slide member 53 upwardly. This resets the driving member in the manner previously described. The meter reader then rotates the knob 107 in a counter-clockwise direction in order to drive the pointers 19, 21 and 23 to their zero positions. He then releases the knob 107 to permit the start of a new billing period.

If it is desired to have the pointers 19, 21 and 23 operate in an accumulative manner, a one-way coupling may be introduced between the pointer 21 and the shaft 89. This coupling is such that rotation of the shaft 89 moves the pointed 21 in an up-scale direction. However, reverse rotation of the shaft 89 has no effect on the position of the pointer. A similar result is achieved alternatively if the meter reader does not rotate the knob 107 to reset the pointers 19, 21 and 23.

Figure 3:
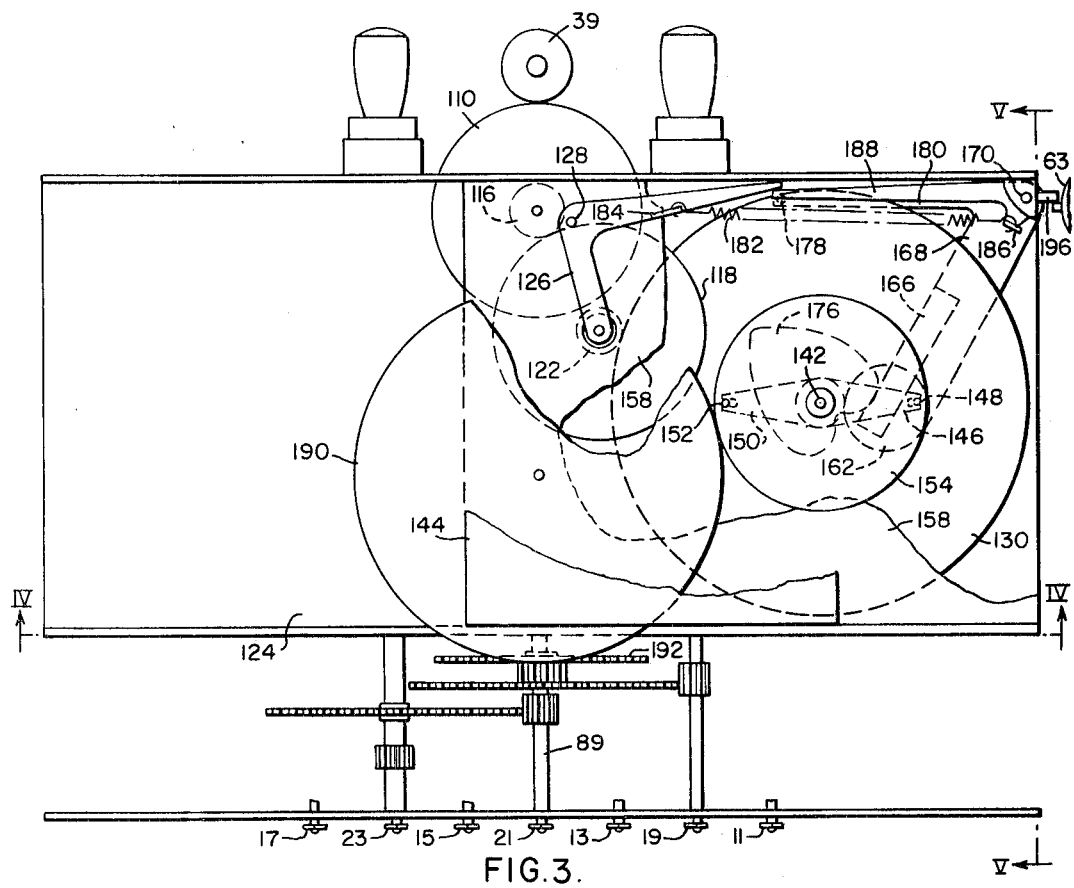
FIG. 3 is a view in top plan of a preferred embodiment of the invention.

The preferred embodiment of the invention illustrated in FIGS. 3, 4 and 5 now will be discussed. The watthour meter pinion 39 acts through a gear 110, a pinion 116 and a gear 118 to rotate a shaft 120 carrying an elongated pinion 122 which corresponds to the pinion 51 of FIG. 2. The lower end of the shaft 120 is pivotally mounted in a plate 124 which forms part of the supporting structure. The upper end of the shaft 120 is pivotally mounted in one end of a bell crank 126 which may be pivoted about a pivot 128, for a distance sufficient to move the pinion 122 out of mesh with an associated gear 130.

The gear 130 is secured to one end of a threaded sleeve 132 which is slidably mounted on a shaft 134. The gear 130 and the sleeve 132 are components of a driving member which corresponds to the driving member 57 of FIG. 2.

A threaded sleeve 136 is aligned with the threaded sleeve 132. These sleeves are mounted on a shaft which may be made in two parts for convenience, one part 134 has its lower end pivotally mounted in the plate 124. A collar 138 together with nuts 140 are associated with the lower threaded end of the shaft 134 for the purpose of adjusting the height of the sleeve 132 above the plate 124. A shaft part 142 has its lower end located within the sleeve 136 in engagement with the upper end of the shaft 134 and has its upper end pivotally mounted in a plate 144 which forms part of the supporting structure.

At its lower end, the sleeve 136 carries an arm 146 which may be engaged by a pin 148 secured to the gear 130. At its upper end, the sleeve 136 carries an arm 150 which may engage an elongated pin 152 having its upper end secured to a gear 154 which in turn is secured to the shaft 142. The sleeve 136 is in threaded engagement with a nut 156, which is secured to a plate 158 constituting a part of the supporting structure. The end of the arm 150 is in the form of a fork having one tine on each side of the pin 152. Consequently the pin 152 and the arm 150 rotate in unison about the axis of the shaft 142 while they are free to move relative to each other in an axial direction. The sleeve 136 and the arms 146, 150 form components of a driven member.

A conical wheel 162 has its edge engaging the threads of the sleeve 132 and constitutes in effect a partial nut for the threaded sleeve. This conical wheel is mounted on a shaft 164 which in turn is mounted for rotation in a bracket that is secured to one end of an arm 168. This arm is secured to a rotatable shaft 170 which is rotatably mounted in the plates 124 and 158 and which may be rotated to move the conical wheel 162 into and out of meshing engagement with the threaded sleeve 132. The friction between the conical wheel 162 and the threaded sleeve 132 may be as much as 90% less than that present between such a threaded sleeve and a fixed nut. The resultant reduction in loading of the associated watthour meter is very desirable.

At the end of each demand interval, the cone wheel 162 is moved away from the threaded sleeve 132 to permit the resetting of the sleeve to its lowest position under the influence of gravity. The sleeve is adjusted to drop slightly below its zero position. When the cone wheel engages the threaded sleeve it lifts the sleeve approximately ¼ of a screw pitch. When the threaded sleeve 132 is reset it is also returned to a zero angular position relative to its axis. Although the magnets of FIGS. 1 and 2 could be employed for this purpose the preferred structure of FIGS. 3, 4 and 5 employs a heart-shaped cam 176 which is engaged by a pin 178 mounted on an arm 180 which is secured to the shaft 170. When the shaft 170 is rotated to move the cone wheel 162 out of engagement with the threaded sleeve 132, continued motion of the shaft brings the pin 178 into engagement with the heart-shaped cam and forces the cam to a position wherein the pin rests in the notch of the cam. When the parts are in the zero position, the pin 148 may overlap the arm 146 by ⅓ to ½ pitch of the screw threads.

A spring 182 extends between a lug 184 on the bell crank 126 and the end of a crank arm 186 which is secured to the shaft 170. This spring biases the pinion 122 into engagement with the gear 130 and biases the cone wheel 162 into engagement with the threaded sleeve 132. An arm 188 secured to the shaft 170 extends adjacent a lug bent downwardly from the right-hand end of the bell crank 126. This arm holds the pinion 122 against the gear 130. When the shaft 170 is rotated to move the cone wheel 162 away from the threaded sleeve 132 it also moves the arm 188 away from the lug on the bell crank 126 and thus allows the spring 182 acting on the lug 184 to move the pinion 122 away from the gear 130.

Figure 6:
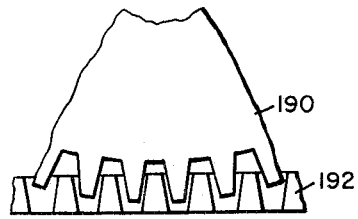
FIG. 6 is a detail view showing portions of gears employed in the embodiment of FIG. 3.

The gear 154 is coupled to a gear 190 which in turn is coupled to the shaft 89 and its pointer 21 in any suitable manner. In a preferred form of the invention, the shaft 89 carries a gear 192 which is essentially a spur or crown gear with teeth tapered to permit meshing of these teeth with the teeth of the spur gear 190 which is at right angles to the gear 192. The tapered configuration of the teeth on the gear 192 will be clear from FIG. 6.

Figure 4:
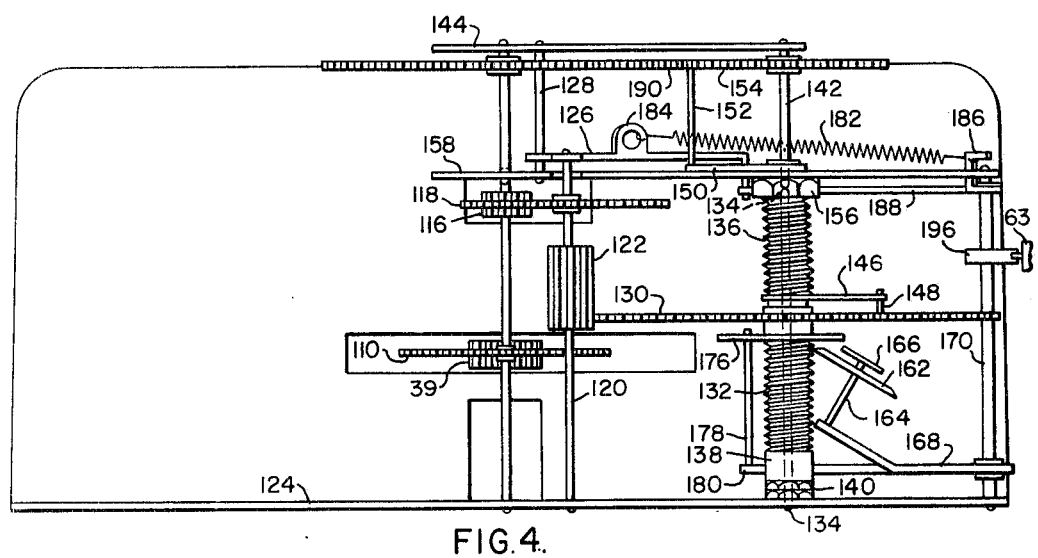
FIG. 4 is a view taken along the line IV—IV of FIG. 3.
Figure 5:
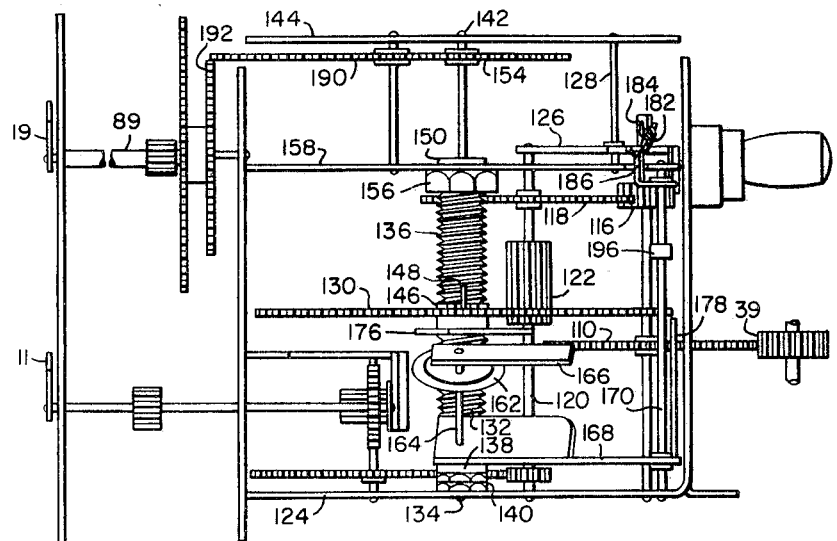
FIG. 5 is a view taken along the line V—V of FIG. 3.

The operation of the embodiment is shown in FIGS. 4 and 5 and is generally similar to that of the embodiment shown in FIGS. 1 and 2. Let it be assumed that a billing period has just been completed and that the device of FIGS. 3, 4 and 5 has been reset. Rotation of the watthour meter results in rotation of the pinion 122 which in turn rotates the gear 130 and the threaded sleeve 132. Because of its mesh with the cone wheel 162 the threaded sleeve 132 together with the gear 130 rise at the rate of 1 pitch per revolution. At the same time the pin 148 rotates the arm 146 and its associated threaded sleeve 136. Because of its mesh with the nut 156 the threaded sleeve 136 also rises at the rate of 1 pitch per revolution. The rotation of the threaded sleeve 136 acts through the arm 150 and the pin 152 to rotate the gear 154 and this in turn acts through the associated gearing to rotate the pointers 19, 21 and 23.

At the end of the first demand interval the shaft 170 is rotated to move the pinion 122 away from the gear 130 and to move the cone wheel 162 away from the threaded sleeve 132. This permits the driving member which includes the gear 130 and the threaded sleeve 132 to drop. However, the sleeve 136 remains in its advanced position. The shaft 170 next is released to permit return of the pinion 122 and the threaded sleeve 132 into mesh respectively with the gear 130 and the cone wheel 162. It will be recalled that the rotation of the shaft 170 also moved the pin 178 into engagement with a heart cam 176 to return the driving member to an angular zero position relative to the axis.

During the second demand interval, the gear 130 and the threaded sleeve 132 are rotated and raised at a rate dependent on the power being measured by the watthour meter. However, if the demand during the second demand interval is less than that of the first demand interval, the pin 148 does not reach the arm 146 and the threaded sleeve 136 together with the pointers 19, 21 and 23 remain stationary. At the end of the second demand interval, the driving member again is reset for a third demand interval in the manner previously set forth.

If the demand occurring during the second demand interval is greater than that of the first demand interval the pin 148 will reach the arm 146 and will further rotate and raise the threaded sleeve 136. This results in further rotation of the gear 154 and of the pointers 19, 21 and 23 which are coupled thereto. Thus, at any time during a billing period, a reading of the pointers 19, 21 and 23 represents the maximum demand occurring during the billing period up to the time of the reading.

At the end of the billing period, the driving member may again be reset in the manner previously described. In addition the meter reader may reset the pointers 19, 21 and 23 and associated components in the manner described with reference to FIGS. 1 and 2.

Should the demand occurring during a demand interval exceed the rated capacity of the device, the gear 53 in FIG. 2 will run past the end of the pinion 51, or the gear 130 in FIG. 4 will run above the end of the pinion 122 to prevent further rotation of such gear. However, such overrun does not interfere with the subsequent resetting of the driving member.

I claim as my invention:

1. In a measuring assembly having a supporting structure and an indicating device movably mounted relative to the structure, the improvement which comprises an operating assembly including an input member rotatably mounted relative to the structure for receiving a rotary mechanical input dependent on a variable quantity, a driven member for operating said indicating device, and a lost-motion coupling between said input member and said driven member, the lost-motion of said coupling permitting a rotation of said input member in excess of one revolution, and reset means effective, while the driven member retains any setting, for returning said input member to a predetermined starting position within the lost-motion range of said coupling, said operating assembly comprising screw thread means mounting the input member for rotational and axial movement relative to an axis, means mounting the driven member for rotational and axial movement relative to said axis, thread releasing means for resetting said input member by axial movement, transmission means coupling the driven member for rotation by the input member while the members are within a predetermined distance of each other along said axis, said last-named means uncoupling the associated members when such members are spaced from each other by more than said predetermined distance, said driven member acting to move said indicating device in dependence on rotation of such member.

2. A measuring assembly as claimed in claim 1 wherein said operating assembly comprises a first screw element, a first thread element in threaded engagement with said said first screw element, a screw unit, a thread unit in threaded engagement with said screw unit, said elements and units having a common axis, means mounting one of said elements for axial and rotational movement relative to the axis in response to relative rotation between said elements to constitute said driven member, means mounting one of said units for axial and rotational movement relative to the axis in response to relative rotation between said units to constitute said input member, said input member being biased away from the driven member, and means mounting said thread unit for movement into and out of threaded engagement with the screw unit.

3. A measuring assembly as claimed in claim 2 wherein one of said thread unit and said thread element comprises a circular thread in threaded engagement with the associated one of the screw unit and the screw element, said circular thread being mounted for rotation about its axis which differs from said common axis.

4. A measuring assembly as claimed in claim 1 in combination with reset means operable for resetting one of said members to a predetermined axial and rotational position.

5. A measuring assembly as claimed in claim 2 in combination with reset means for setting said input member to a predetermined axial and rotational position, said reset means comprising means for uncoupling said units from each other to permit axial movement of one of said units to a predetermined axial position, and means for applying a force to said last-named unit while uncoupled urging such element to a predetermined angular position relative to the axis.

6. A measuring assembly as claimed in claim 5 wherein said thread unit comprises a circular thread mounting for rotation about an axis differing from said first-named axis, said reset means comprising means for moving said circular thread away from its associated screw unit to uncouple said units, said indicating device comprising a multiple-order counter.

7. A measuring assembly as claimed in claim 1 wherein said operating assembly comprises a first screw element, a first thread element in threaded engagement with said first screw element, a screw unit, a thread unit in threaded engagement with said screw unit, said element and units having a common axis, means mounting one of said elements for axial and rotational movement relative to the axis in response to relative rotation between said elements to constitute said driven member, means mounting one of said units for axial and rotational movement relative to the axis in response to relative rotation between said units to constitute said input member, said input member being biased away from the driven member, and means mounting said thread unit for movement into and out of threaded engagement with the screw unit, said indicating device comprising a multiple order counter having a rotatable actuator coupled for rotation in accordance with rotation of said driven member in at least one direction of rotation.

8. A measuring assembly as claimed in claim 7 wherein said thread unit comprises a wheel mounted for rotation about its axis and having a continuous rim meshing with the threads of the screw unit, whereby rotation of the screw unit rotates said wheel and advances the screw unit relative to the wheel due to the mesh therebetween.

9. A measuring system as claimed in claim 8 in combination with a rotatable actuator releasably coupled to said screw unit for rotating the screw unit in accordance with rotation of the actuator while permitting axial movement of the screw unit, and reset control means operable for decoupling the thread unit from the screw unit and for decoupling the actuator from the screw unit to facilitate resetting of the screw unit to a predetermined position.

10. A measuring system as claimed in claim 9 wherein said reset control means includes means for resetting the screw unit to a predetermined angular position.

References Cited

UNITED STATES PATENTS

| | | | |
|---|---|---|---|
| 1,698,358 | 1/1929 | Borel | 324—103 |
| 3,092,318 | 6/1963 | Ham | 324—103 |

RUDOLPH V. ROLINEC, Primary Examiner

E. F. KARLSEN, Assistant Examiner